United States Patent
Lupandina et al.

(10) Patent No.: US 12,046,900 B2
(45) Date of Patent: Jul. 23, 2024

(54) SYSTEM AND METHOD FOR OPTIMIZING A SWITCHING STATE OF A SWITCHING ARRANGEMENT OF AN ELECTRICAL DISTRIBUTION ARRANGEMENT

(71) Applicant: Maschinenfabrik Reinhausen GmbH, Regensburg (DE)

(72) Inventors: Irina Lupandina, Vienna (AT); Michael Schrammel, Vienna (AT)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 83 days.

(21) Appl. No.: 18/002,866

(22) PCT Filed: May 26, 2021

(86) PCT No.: PCT/EP2021/063967
§ 371 (c)(1),
(2) Date: Dec. 22, 2022

(87) PCT Pub. No.: WO2022/002486
PCT Pub. Date: Jan. 6, 2022

(65) Prior Publication Data
US 2023/0253788 A1    Aug. 10, 2023

(30) Foreign Application Priority Data

Jun. 29, 2020 (DE) ...................... 10 2020 117 079.3

(51) Int. Cl.
*H02J 3/00* (2006.01)
(52) U.S. Cl.
CPC .............. *H02J 3/003* (2020.01); *H02J 3/001* (2020.01); *H02J 2203/20* (2020.01)
(58) Field of Classification Search
CPC ......... H02J 3/003; H02J 3/001; H02J 2203/20
(Continued)

(56) References Cited

U.S. PATENT DOCUMENTS 9,002,531 B2 * 4/2015 Mansfield ............... H02J 3/003
                                                           700/291
9,715,261 B2 * 7/2017 Wilkins ................... H02J 3/14
(Continued)

FOREIGN PATENT DOCUMENTS

DE    102017114309 A     1/2019
JP    H 10341531 A      12/1998
(Continued)

OTHER PUBLICATIONS

Falkensteinstrasse Reinhausen GMBH et al: "Maschinenfabrik Vattenfall setzt im Kraftwerk Boxberg auf das MR-Flottenmonitoring TESSA", Oct. 1, 2015 (Oct. 1, 2015), pp. 1-4, XP055830702, Retrieved from the Internet URL:https://www.reinhausen.com/de/Portaldata/1/Resources/rg/news/2016/Presseinformation_KW_Boxberg_Tessa_April_2016_03_Final.docx.

*Primary Examiner* — Alfonso Perez Borroto
(74) *Attorney, Agent, or Firm* — LEYDIG, VOIT & MAYER, LTD.

(57) ABSTRACT

A switching state of a switching arrangement of an electrical distribution arrangement is optimized. In each switching state, an outgoing circuit of the distribution arrangement is connected to a supply by the switching arrangement via a component. Each state differs from others in that the outgoing circuit is connected to the supply via another component. The switching arrangement has enough switching states that each outgoing circuit is connectable to a supply via two different components. An outgoing circuit is presented based on: operating parameters of the components, a switching state, outgoing loads; environmental parameters of the electrical components, forecasted environmental parameters, and forecasted outgoing loads. Forecasted operating parameters are simulated to compare future operating parameters with limit values. Based on likely exceeding (Continued)

limit values in the future, an alternative switching state is suggested such that limit values are not exceeded.

25 Claims, 2 Drawing Sheets

(58) Field of Classification Search
USPC .......................................................... 307/18
See application file for complete search history.

(56) References Cited

U.S. PATENT DOCUMENTS

| 2014/0025211 | A1* | 1/2014 | Cheim | H02J 13/00001 |
| | | | | 700/286 |
| 2019/0340708 | A1* | 11/2019 | Viereck | G06Q 10/0631 |
| 2020/0132049 | A1 | 4/2020 | Feltes et al. | |

FOREIGN PATENT DOCUMENTS

| WO | WO 2009042581 A1 | 4/2009 |
| WO | WO 2018137980 A1 | 8/2018 |

* cited by examiner

SYSTEM AND METHOD FOR OPTIMIZING A SWITCHING STATE OF A SWITCHING ARRANGEMENT OF AN ELECTRICAL DISTRIBUTION ARRANGEMENT

CROSS REFERENCE TO RELATED APPLICATIONS

This application is a U.S. National Phase application under 35 U.S.C. § 371 of International Application No. PCT/EP2021/063967, filed on May 26, 2021 and claims benefit to German Patent Application No. DE 10 2020 117 079.3, filed on Jun. 29, 2020. The International Application was published in German on Jan. 6, 2022 as WO 2022/002486 A1 under PCT Article 21(2).

FIELD

The present disclosure relates to a system for optimizing a switching state of an electrical distribution arrangement, and to a method for optimizing a switching state of an electrical distribution arrangement.

BACKGROUND

Electrical distribution arrangements, for example substations, comprise at least one supply input, via which the distribution arrangement is connected, for example, directly or indirectly to one or more power plants, the switching arrangement, a plurality of electrical components and at least one outgoing circuit, via which loads are present at the distribution arrangement. The switching arrangement has a plurality of switching states. In each switching state, at least one outgoing circuit of the switching arrangement is connected to at least one supply input of the switching arrangement via at least one of the electrical components. The electrical components may be, for example, transformers, overhead lines, filters, reactive power compensation installations or uninterruptible power supply installations. Each switching state differs from every other switching state in that at least one outgoing circuit of the switching arrangement is connected to the supply input via another electrical component. In addition, there are at least so many switching states that each outgoing circuit can be electrically connected to the supply input via two different components. For example, each outgoing circuit can be connected to at least one supply input via two different transformers by selecting two different switching states.

By means of the switching arrangements, the different switching states can thus be used to set which loads present at the outgoing circuits are connected to the supply input via which electrical components of the distribution arrangement. For example, the overloading of individual electrical components can be avoided, as a result of which the electrical components would otherwise age prematurely or even be damaged.

In the operational management of meshed, radially operated networks, it is sometimes required, for example, that if an electrical component of the electrical distribution arrangement fails, there is always at least one alternative switching state that can be switched over to (so-called (N-1) safety). This is usually achieved by oversizing the electrical components or the electrical distribution arrangements, i.e. for example a substation, in which case it is usually determined for the most unfavorable environmental and operating conditions to be expected which switching states are permissible as a reaction to the failure of which electrical component. This is used to determine an assignment of alternative switching states which are used in the event of failures. This assignment is static, i.e. no dynamic or temporally variable aspects whatsoever are taken into account. In particular, any overload capacities that may exist but are limited in time are not taken into account.

WO 2018/137980 A1 discloses a method for planning the use of electrical components or operating resources of an electrical energy supply system. In the course of the method, a state index and a criticality index are first determined for a future point in time from first parameters that describe a condition of the operating resource, second parameters that describe a relevance of the operating resource and characteristic variables of the operating resource. A state index representing a risk analysis of the system is derived from the two indices. The stability and/or availability of the electrical system at the future point in time is/are evaluated on the basis of the state index.

Proceeding from this, the present inventors have recognized that a person skilled in the art is faced with providing an improved method and an improved system for optimizing the switching state of an electrical distribution arrangement.

SUMMARY

In an embodiment, the present disclosure provides a system that optimizes a switching state of a switching arrangement of an electrical distribution arrangement. The electrical distribution arrangement has: at least one supply input; the switching arrangement; a plurality of electrical components; and at least one outgoing circuit. The switching arrangement has a plurality of switching states. In each switching state of the plurality of switching states, the at least one outgoing circuit of the distribution arrangement is electrically connected to the at least one supply input of the distribution arrangement by the switching arrangement via at least one electrical component of the plurality of electrical components. Each of the switching states differs from every other switching state in that the at least one outgoing circuit is electrically connected to the at least one supply input via another electrical component of the plurality of electrical components. The switching arrangement has at least so many switching states that each one of the at least one outgoing circuit is electrically connectable to the at least one supply input via two different components of the plurality of electrical components. The system is configured to: present the at least one outgoing circuit based on: operating parameters of the electrical components of the plurality of electrical components, a present switching state of the switching arrangement, loads currently present at the at least one outgoing circuit of the distribution arrangement, present environmental parameters of the electrical components, forecasts of an expected future progression of the environmental parameters of the electrical components, and forecasts of an expected future progression of the loads present at the at least one outgoing circuit; simulate a future development of the operating parameters of the plurality of electrical components, to compare the future development of the operating parameters with limit values, and based on one or more limit values being considered likely to be exceeded at a future point in time, suggest at least one alternative switching state that was selected in such a way that none of the operating parameters exceeds any limit value of the limit values.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

According to aspects of the present disclosure, a system for optimizing a switching state of a switching arrangement of an electrical distribution arrangement and a method for optimizing a switching state of a switching arrangement of an electrical distribution arrangement are provided.

In a first aspect, a system for optimizing a switching state of a switching arrangement of an electrical distribution arrangement is provided. The electrical distribution arrangement has at least one supply input, the switching arrangement, a plurality of electrical components and at least one outgoing circuit. The switching arrangement has a plurality of switching states. In each switching state of the plurality of switching states, at least one outgoing circuit of the distribution arrangement is electrically connected to at least one supply input of the distribution arrangement by means of the switching arrangement via at least one component of the plurality of components. Each switching state differs from every other switching state in that at least one outgoing circuit is electrically connected to the at least one supply input via another component of the plurality of components. The switching arrangement has at least so many switching states that each outgoing circuit can be electrically connected to a supply input via two different components of the plurality of components. The system is configured, on the basis of operating parameters of the components of the plurality of components, a present switching state of the switching arrangement, loads currently present at the at least one outgoing circuit of the distribution arrangement and present environmental parameters of the components as well as forecasts of an expected future progression of the environmental parameters of the components and forecasts of an expected future progression of the loads present at the at least one outgoing circuit, to simulate a future development of operating parameters of the plurality of components, to compare it with limit values and, if one or more limit values are considered likely to be exceeded at a future point in time, to suggest at least one alternative switching state which was selected in such a way that none of the operating parameters exceeds a limit value.

A system, which can be used to optimize the switching states of a switching arrangement of an electrical distribution arrangement, for example a substation that is part of a radially operated electrical network, is also provided. The optimization can be used, for example, to plan the use of the individual electrical components of the distribution arrangement and to ensure their availability when they are needed.

In addition to the switching arrangement already mentioned and the electrical components already mentioned, the electrical distribution arrangement may include a supply input and at least one outgoing circuit and preferably include a plurality of outgoing circuits, at which loads may be present. In this case, load denotes the electrical power, for example.

The electrical distribution arrangement may be connected to one or more producers via the supply input(s) using supply lines and, if necessary, further elements. A producer can be, for example, a conventional power plant or an installation for producing energy from regenerative sources, for example a wind energy installation. For example, the distribution arrangement can also be operated as a collection station which has a plurality of supply inputs, each of which is connected to a wind energy installation, and via which the energy produced by the wind energy installations is fed into a supply network that is connected to one or more of the outgoing circuits of the distribution arrangement.

The electrical components of the distribution arrangement, which are also referred to as (electrical) operating resources, are, for example, transformers, overhead lines, cables, inductors, filters, reactive power compensation installations, or uninterruptible power supply installations. The electrical components are arranged as part of the electrical distribution arrangement between the supply input(s) and the outgoing circuit(s), wherein the switching arrangement can be used to set which outgoing circuit is connected to which supply input via which electrical components.

The switching arrangement may include, for example, a plurality of isolating switches and circuit breakers which can be switched in such a way that different outgoing circuits can be connected to the supply input(s) via different electrical components, or an outgoing circuit can be connected to the supply input(s) via different electrical components. The various possible ways in which the outgoing circuits can be connected to the supply input(s) are referred to as switching states of the switching arrangement. The switching arrangement is configured in such a way that at least two switching states are provided for each outgoing circuit, in which switching states the outgoing circuit is connected to the supply input(s) via different electrical components. The switching states are therefore alternative options which can be used to connect an outgoing circuit to the supply(s).

In order to optimize the switching state of the switching arrangement, the system is configured to simulate a future development of operating parameters of the electrical components of the system, to compare it with limit values and, if one or more limit values are considered to be exceeded at a future point in time, to suggest at least one alternative switching state in which no operating parameter exceeds a limit value. The simulation preferably takes place over a defined period of time, for example 24 hours, with the operating parameters being able to be simulated in 15-minute steps, for example.

Operating parameters are properties of electrical components that characterize their present state and change over time. Examples of operating parameters of a transformer are in particular the top oil temperature and the hot-spot temperature of the transformer oil. Other examples of operating parameters of a transformer are, inter alia, the primary-side and secondary-side voltage, the primary-side and secondary-side current, the temperature of the insulating oil of an on-load tap changer, the moisture content of the insulating oil, the moisture content of the paper insulation, the concentration of dissolved gases in the insulating oil, the capacitance of capacitor bushings, the winding tension force, etc. As dynamic parameters, i.e. parameters that change over time, the operating parameters depend, inter alia, on the load that is present at the respective electrical component over time, i.e. the progression of the load.

Instead of the load, the utilization of the electrical component can also be considered, which indicates the ratio of the present power to the nominal power or the ratio of the present value of the current to the nominal current. Furthermore, the operating parameters depend on environmental parameters of the electrical components, for example the ambient temperature.

In order to simulate the future development of operating parameters, the development of the operating parameters is calculated, starting from present values, or values measured at a known point in time, for the operating parameters, using one or more mathematical models on the basis of an expected utilization of the electrical component or an expected load present at the electrical component and an expected, i.e. forecast, progression of one or more environmental parameters of the electrical component. For example, the hot-spot temperature of a transformer can be simulated in a first approximation using only the progression of the ambient temperature of the transformer and the load present at the transformer.

The models can also include further input variables which can be both variable over time and constant over time. Corresponding input variables which are variable over time may be, for example, variables determined offline using routine measurements, for example the concentrations of dissolved gases in the insulating oil and/or results of visual inspections. Input variables that are constant over time are, for example, information about the installation location, manufacturer, year of manufacture, performance class and/or switching group of the electrical component.

Finally, it is checked whether the simulated operating parameters may develop in such a way that one or more limit values are considered to be exceeded at a future point in time. Limit values may be, for example, absolute limit values, i.e., for example, a maximum top oil temperature of a transformer which must under no circumstances be exceeded and which is considered to have been exceeded as soon as the top oil temperature exceeds it. Alternatively, it is also possible to use relative limit values which are considered to be exceeded only when they are exceeded for a predetermined time. For example, it is conceivable that a hot-spot temperature of a transformer may be at most 10% higher than a limit value for at most 20 minutes, but is considered to be exceeded only when it is exceeded for more than 20 minutes or by more than 10%.

If at least one limit value is exceeded in the period of time for which the development of the operating parameters is simulated, the system automatically suggests at least one alternative switching state in which the electrical components of the system are connected to the outgoing circuit(s) in such a way that no limit value is considered to be exceeded in the alternative switching state.

Alternative switching states can be determined in different ways

The system thus advantageously makes it possible to take account of overload capacities that change over time during the operational management of an electrical distribution arrangement, such that it is also possible to resort to those switching states in which absolute limit values may be exceeded temporarily but within a permissible framework. It is thus possible to specify other alternative switching states that would not be taken into account in conventional, static planning. This advantageously increases the reliability of the network.

In one preferred embodiment, the system comprises a central data processing (data processor) unit configured to suggest the alternative switching state. This may be, for example, a local server or another data processing apparatus that is arranged in the region of the electrical distribution arrangement. Specifically, it could be a computer that is used in a control room of a substation. The central data processing unit can also be formed by one or more distributed computing units that are operated, for example, as an internal or external cloud service.

It is furthermore preferred if a monitoring unit is arranged on at least one component of the plurality of components and is configured to provide operating parameters of the component, on the basis of which the future development of the operating parameters of the plurality of components is simulated. The monitoring unit can be configured, for example, to record operating parameters of the electrical components such as temperatures and can also provide limit values for the respective electrical component. In addition, other characteristic data can also be provided by the monitoring unit, for example nominal power, year of manufacture, maintenance times, etc. Providing here includes any form in which the operating parameters are made available for simulating the expected future progression of the operating parameters. A monitoring unit is preferably arranged on each component, but this is not necessary. Should the monitoring units of individual components fail, it is possible to advantageously resort to mathematical models with fewer details for these components, which models still allow the operating parameters to be estimated.

The monitoring unit of the at least one component is preferably configured to simulate the future development of the operating parameters of the respective component. In other words, the future progression or future development of the operating parameters is simulated by the monitoring unit which provides the present operating parameters and also other characteristic data. In this case, providing could be understood as meaning, for example, that the present operating parameters are provided for the calculation without having to be transmitted to another unit for this purpose. In particular, this has the advantage that all necessary properties of the electrical component do not have to be transmitted via a network. In addition, the same models as are also used to calculate operating parameters from measured data during operation can be used to simulate the future development of the operating parameters. For example, the top oil temperature of a transformer can be measured and transmitted to the monitoring unit. Based on the load present at the transformer and the ambient temperature and other input parameters, this monitoring unit calculates the hot-spot temperature of the transformer therefrom. The same model can be used to simulate the hot-spot temperature. This embodiment also allows various components to be taken into account in the method with correspondingly adapted monitoring units, without the structure of the components and the models used having to be known to the central data processing unit, provided that the monitoring units are adapted to carry out corresponding simulations and to report the simulated values back to the central data processing unit.

Alternatively, it is preferred that the central data processing unit is configured to simulate the future development of the operating parameters of at least one component. For example, the central data processing unit can only simulate the development of the operating parameters for those components on which there is no monitoring unit or on which there is arranged a monitoring unit which is not suitable for simulating the development of operating parameters or which fails at times. However, it is also conceivable to use the central data processing unit to simulate the development of the operating parameters of all components.

So that the central data processing unit can carry out the simulation, the operating parameters are transmitted from a monitoring unit—if available—to the central data processing unit and made available to this extent, and the models used to simulate the operating parameters, including all operating parameters, are stored in the central data processing unit. The transmission can take place, for example, by means of a directed transmission to the central data processing unit, for example at regular time intervals or in response to a request. Alternatively, it is also possible, for example, for the monitoring unit to transmit the operating parameters at regular time intervals in an undirected manner to a bus, for example a field or process bus, from which the central data processing unit automatically reads the operating parameters.

In one preferred embodiment, the system is further configured to suggest a point in time at which there should be a change into the at least one alternative switching state. For example, it is advantageously possible to already switch to an alternative switching state before an electrical component is overloaded.

In order to determine the at least one alternative switching state, the system is further configured to simulate, for a plurality of potential switching states of the switching arrangement, the future development of the operating parameters of the plurality of components for a predetermined period of time on the basis of the operating parameters, the present switching state, the loads present at the at least one outgoing circuit and the present environmental parameters as well as the forecasts of the expected future progression of the environmental parameters and the forecasts of the expected future progression of the loads present at the at least one outgoing circuit.

In other words, in the preferred embodiment, the simulation is not only carried out for the present switching state of the switching arrangement, but also for various other switching states in order to find out which switching state might be suitable as an alternative switching state.

In order to determine the at least one alternative switching state, the system is preferably further configured to simulate, for the plurality of potential switching states of the switching arrangement, the future development of the operating parameters of the plurality of components for different switching times at which a switch is made from the present switching state to the respective potential switching state.

In other words, for the plurality of potential switching states, it is taken into account that it is possible to switch from the present switching state to the potential switching state at a wide variety of points in time. Since the load progression across the electrical components also changes with the time of switching, the switching times have different effects on the expected progression of the operating parameters. By taking the switching time into account, it is possible, for example, to prevent a switching state, in which the distribution arrangement may not be able to be operated safely in the event of an unexpected switching time, from being selected as an alternative. The switching times can, for example, match the times for which the operating parameters are simulated.

It is further preferred if, in order to determine the at least one alternative switching state, the system is further configured to determine, within the framework of the simulation, for each of the plurality of potential switching states for each switching time, a maximum period of time over which the potential switching state can be operated, without at least one operating parameter of the plurality of components exceeding a limit value, and to suggest the at least one alternative switching state on the basis of the determined maximum periods of time.

In the preferred embodiment, it is determined, for each switching state and each switching time, how long the electrical distribution arrangement can be operated in the switching state, depending on the switching time, until a limit value is exceeded, in which case a limit value can only be exceeded when a period of time, for which the operating parameter may exceed the limit without being considered to be exceeded, has been exceeded. This period of time thus indicates how long the newly selected switching state can be operated without exceeding a limit value.

The maximum periods of time determined in this way advantageously make it possible for the system, when a limit value is exceeded by an operating parameter, to advantageously suggest an alternative switching state which can be operated for as long as possible.

The system is preferably further configured to determine, for each potential switching state, a minimum period of time, over which the switching arrangement can be operated in the switching state independently of the switching time, without a limit value being considered to be exceeded by a simulated operating parameter, from the maximum periods of time determined for the switching times, and to suggest, as the at least one alternative switching state, that switching state or one of those switching states of the plurality of potential switching states, in which the determined minimum period of time over which the switching arrangement can be operated in the switching state independently of the switching time is the longest compared to all other determined minimum periods of time of the plurality of potential switching states.

The minimum time over which the electrical distribution arrangement can be operated at the switching time without a limit value being considered to be exceeded is therefore determined for each switching state. This time therefore indicates how long the electrical distribution arrangement can be operated in the switching state in any case, regardless of when a switch is made to the respective switching state. That switching state or those switching states for which the minimum time is the longest is/are now selected from all switching states, such that the system can be operated in the new switching state for as long as possible, regardless of the point in time at which a change becomes necessary due to a limit value being exceeded.

It is also preferred if the system is configured to evaluate operating parameters of the electrical components as a basis for simulating the future development of the operating parameters of the components using pattern recognition or machine learning methods.

The components of the distribution arrangement are preferably transformers, an operating parameter is preferably a hot-spot temperature in turns of the transformers or a top oil temperature of the transformers, and/or an operating parameter of the transformers is an electric current flowing through the transformers.

The environmental parameters of the electrical components are preferably ambient temperatures.

In one preferred embodiment, an operating parameter of a component is compared with at least one dynamic limit value, wherein a dynamic limit value is considered to be exceeded only when the operating parameter compared with the limit value exceeds the limit value for a predetermined time, and wherein at least one operating parameter of a component is preferably compared with at least one absolute limit value, wherein an absolute limit value is considered to be exceeded as soon as the operating parameter compared with the limit value exceeds the limit value.

In a second aspect, the problem on which aspects of the present disclosure are based is solved by means of a method for optimizing a switching state of a switching arrangement of an electrical distribution arrangement, wherein the electrical distribution arrangement has at least one supply input, the switching arrangement and at least one outgoing circuit, wherein the switching arrangement has a plurality of switching states, wherein, in each switching state of the plurality of switching states, at least one outgoing circuit of the distribution arrangement is electrically connected to at least one supply input of the distribution arrangement by means of the switching arrangement via one component of the plurality of components, wherein each switching state differs from every other switching state in that at least one outgoing circuit is electrically connected to at least one supply input via another component of the plurality of components, and wherein the switching arrangement has at least so many switching states that each outgoing circuit can be electrically connected to the supply input via two different components of the plurality of components, wherein the method comprises the following steps:

simulating a future development of operating parameters of the plurality of components on the basis of operating parameters of the components, a present switching state of the switching arrangement, loads present at the at least one outgoing circuit and present environmental parameters of the plurality of components as well as forecasts of a progression of the environmental parameters of the plurality of components and forecasts of a progression of loads present at the at least one outgoing circuit, comparing the simulated operating parameters with limit values, and, if one or more limit values are considered likely to be exceeded in the present switching state at a future point in time, suggesting at least one alternative switching state in which none of the simulated operating parameters is considered to be exceeded.

In one preferred embodiment, the alternative switching state is suggested by a central data processing unit.

A monitoring unit is preferably arranged on each component of the plurality of components and provides operating parameters of the component, on the basis of which the future development of the operating parameters of the plurality of components is simulated. In this case, the future development of the operating parameters of each component is preferably simulated by the monitoring unit of the respective components. Alternatively, it is preferred that the central data processing unit simulates the future development of the operating parameters of the components.

It is further preferred if, in the course of the method, a point in time at which there should be a change into the at least one alternative switching state is suggested.

In order to determine the at least one alternative switching state, for a plurality of potential switching states of the switching arrangement, the future development of the operating parameters of the plurality of components is preferably simulated for a predetermined period of time on the basis of the operating parameters, the present switching state, the loads present at the switching outputs and the present environmental parameters as well as the forecast of the progression of the environmental parameters and the forecast of the progression of the loads present at the at least one outgoing circuit.

In this context, it is preferred if, in order to determine the at least one alternative switching state, for the plurality of potential switching states of the switching arrangement, the future development of the operating parameters of the plurality of components is simulated for different switching times at which a switch is made from the present switching state to the respective potential switching state.

Preferably, in order to determine the at least one alternative switching state, within the framework of the simulation, for each of the plurality of potential switching states for each switching time, a maximum period of time is determined, over which the potential switching state can be operated, without at least one limit value being considered to be exceeded by a simulated operating parameter, and the at least one alternative switching state is suggested on the basis of the determined maximum periods of time. In this case, for each potential switching state, a minimum period of time, over which the switching arrangement can be operated in the respective switching state independently of the switching time, without a limit value being considered to be exceeded, is determined from the maximum periods of time for the different switching times, and wherein that switching state or one of those switching states of the plurality of potential switching states, in which the determined minimum period of time over which the switching arrangement can be operated in the switching state independently of the switching time is the longest compared to all other determined minimum periods of time of the plurality of potential switching states, is suggested as an alternative switching state.

Operating parameters of the components are preferably evaluated as a basis for simulating the future development of the operating parameters of the components using pattern recognition or machine learning methods.

In one preferred embodiment, the components of the distribution arrangement are transformers, wherein an operating parameter of the transformers is preferably a hot-spot temperature in turns of the transformers, wherein an operating parameter of the transformers is preferably a maximum top oil temperature, and/or wherein at least one operating parameter of the transformers is preferably an electric current flowing through the respective transformer.

The environmental parameters of the components are preferably ambient temperatures.

At least one operating parameter of a component is compared with at least one dynamic limit value, wherein a dynamic limit value is considered to be exceeded only when the operating parameter compared with the limit value exceeds the limit value for a predetermined time, and wherein at least one operating parameter of a component is preferably compared with at least one absolute limit value, wherein an absolute limit value is considered to be exceeded as soon as the operating parameter compared with the limit value exceeds the limit value.

The advantages of the different embodiments of the method correspond to the advantages of the corresponding embodiments of the system. In addition, the configurations of the system presented in the context of the description of the system can also be applied to the method.

Figure 1:
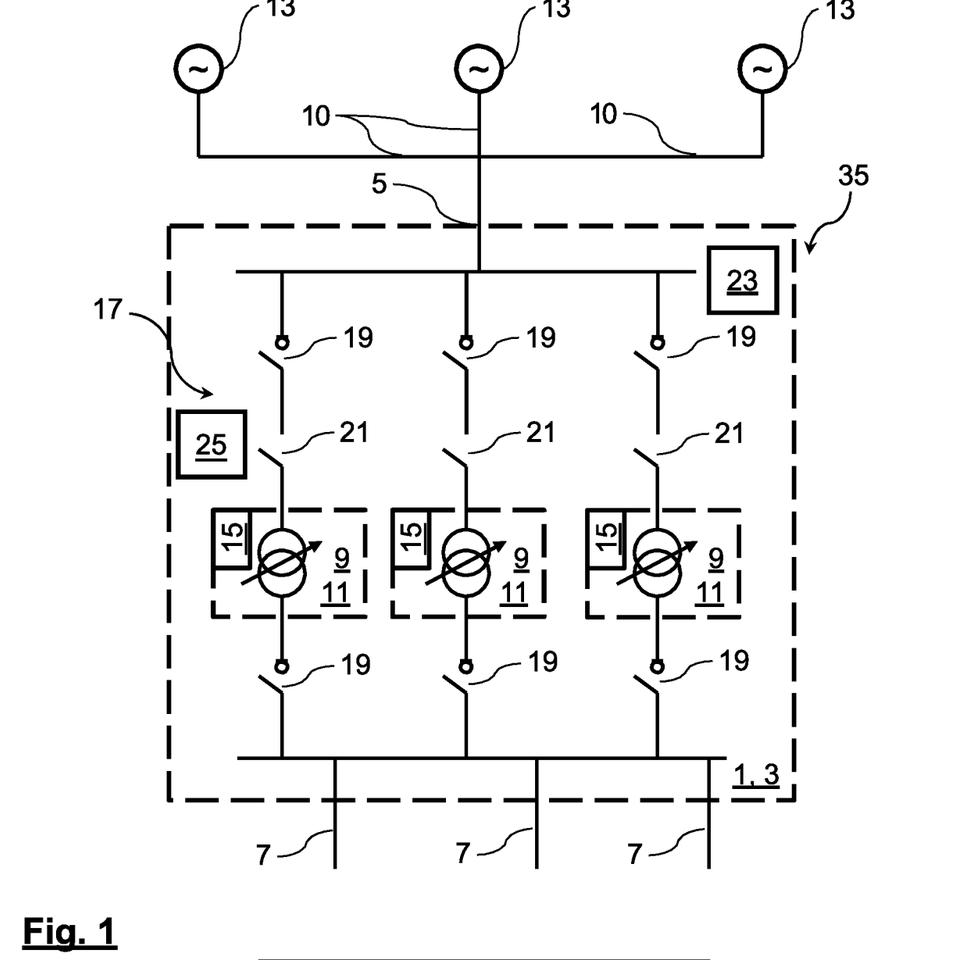
FIG. 1 shows a schematic illustration of one embodiment of an electrical distribution arrangement having a switching arrangement.

FIG. 1 shows one embodiment of an electrical distribution arrangement 1 in the form of a substation 3. The distribution arrangement 1 comprises a supply input 5, a plurality of outgoing circuits 7 and a plurality of electrical components or operating resources 9. Only three outgoing circuits 7 and only three electrical components 9 are illustrated in FIG. 1, but the distribution arrangement 1 comprises further outgoing circuits and electrical components.

The supply input 5 is connected via overhead lines 10 to three producers 13 which may be wind energy installations, for example. The electrical distribution arrangement 1 is connected to loads or consumers via further lines which are connected to the outgoing circuits 7.

The electrical components 9 of the distribution arrangement 1 which are illustrated in the exemplary embodiment are transformers 11. A monitoring unit 15 is arranged on each transformer 11 and determines and manages operating parameters and key figures of the transformer 11. For example, the monitoring unit (monitor) 15 uses a sensor to determine a top oil temperature of the transformer 11 as an operating parameter and uses this to determine a hot-spot temperature of the transformer 11 in turns of coils of the transformer 11 using a mathematical model and further operating parameters and key figures of the transformer 11. The monitoring unit 15 also records the current flowing through the transformer 11. Furthermore, characteristic data that do not change over time, such as nominal power and year of manufacture of the transformer, and historical data, for example DGA analyses, commissioning tests and results of visual inspections, are kept in the monitoring unit 15.

Limit values which must not be exceeded during operation are defined for each electrical component 9. The limit values can be stored in the monitoring units. In the present case, a distinction is made between absolute limit values and relative limit values. An absolute limit value must not be exceeded under any circumstances, i.e. it is considered to be exceeded regardless of the duration for which it will be exceeded. For example, it is possible to define a maximum current or a maximum utilization of a transformer 11 which must not be exceeded under any circumstances. For example, it can be specified that the utilization of a transformer must not exceed 140% of the nominal power. Relative limit values also include a time component. As a relative limit value, it is possible to specify, for example, a specific utilization that may be exceeded for a predetermined period of time without the limit value being considered to be exceeded. For example, for a transformer, it can be specified that the utilization above 100% of the nominal power up to 120% of the nominal power can be exceeded for a period of one hour. Only when the time component of the limit value is also exceeded is it considered to have been exceeded.

The electrical distribution arrangement also comprises a switching arrangement 17 which is formed by a plurality of circuit breakers 19 and isolating switches 21, collectively referred to as switches 19, 21. The switching arrangement 17 can assume different switching states in which different switches 19, 21 are opened and closed in each case and thus different electrical components 9 are connected to outgoing circuits 7 and to the supply input 5.

Finally, the electrical distribution arrangement 1 comprises a central data processing device or data processing unit 23 which is connected to the monitoring units 15 and also to a controller 25 of the substation 3, which in particular controls the positions of the switches 19, 21 and thus the switching states of the switching arrangement 17. The central data processing 23 is also connected to external data sources, which will be discussed in yet more detail below.

Figure 2:
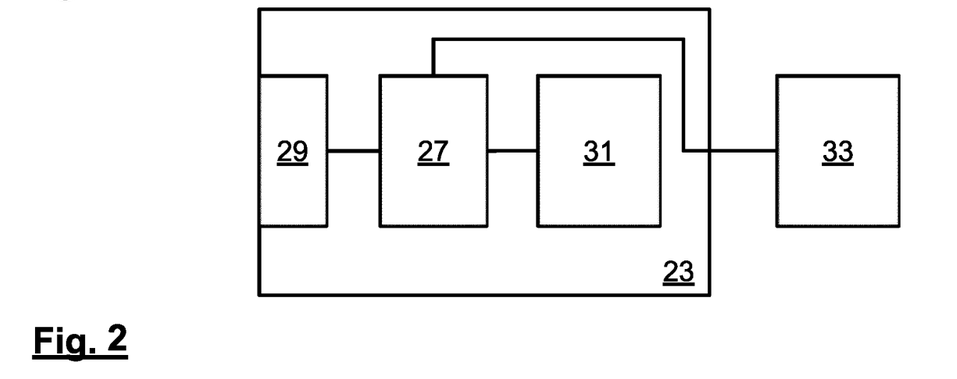
FIG. 2 shows a schematic illustration of one embodiment of a data processing device.

FIG. 2 schematically shows the structure of an exemplary data processing unit 23, like that shown in FIG. 1. This comprises a central processing unit or CPU 27, a communication unit 29 and a memory 31. Furthermore, FIG. 2 shows a user interface 33, for example a screen and one or more input devices, via which a user can interact with the central data processing unit 23 and via which results of the system can be displayed to the user. The user interface 33 is not necessarily part of the central data processing unit 23. Via the communication unit 29, the central data processing unit 23 can communicate, inter alia, with the controller 25, the monitoring units 15 and other data sources, i.e. can receive and transmit data.

Figure 3:
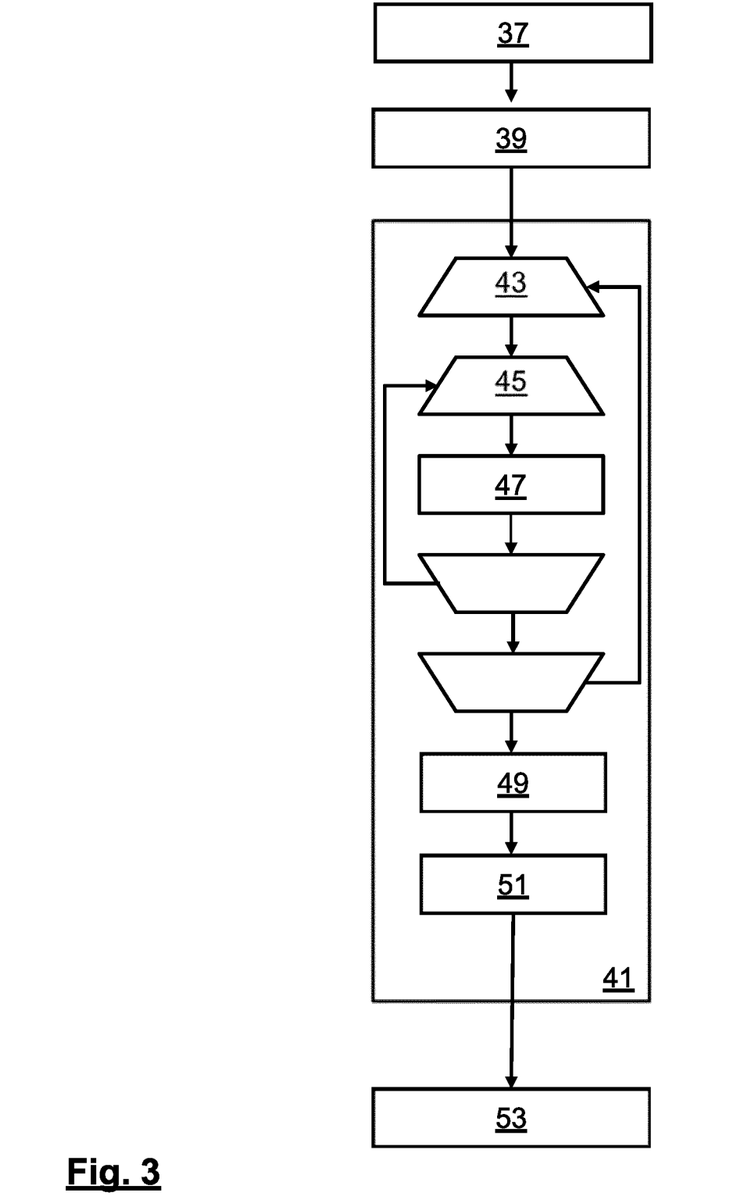
FIG. 3 shows a flowchart of one embodiment of a method for optimizing a switching state of a switching arrangement of an electrical distribution arrangement.

The operation of the exemplary embodiment of a system 35 for optimizing the switching state of the switching arrangement 17 of the electrical distribution arrangement 1 and of an exemplary embodiment of a method is explained in more detail below with reference to FIG. 3. The system can—depending on the embodiment—be formed solely by the appropriately configured central data processing unit 23, additionally comprise the monitoring units 15, or also comprise further elements of the distribution arrangement.

In a first step 37 of the method, expected loads at the outgoing circuits 7 and expected developments in environmental parameters of the electrical components 9 are taken as a basis for simulating how at least one operating parameter of the electrical components 9 will develop over a forecast period starting from a present value of the operating parameter. For this purpose, the forecast period, which is 24 hours for example, can be subdivided into constant time segments, for example 15 minutes, for which simulation is carried out in each case. Both the forecast period and the points in time or time segments can be flexibly adjusted if the external data sources provide forecasts for longer and/or more detailed forecast periods. If the simulation is continuously updated, the forecast period and with it the forecast times continue to move.

In the present exemplary embodiment, the expected loads over the forecast period and the development of the ambient temperature, which represents the environmental parameter, that is expected in this period are made available to the central data processing unit 23 from external data sources via the communication unit 29. The operating parameter is the hot-spot temperature of the transformers 11, the development of which can be simulated over the forecast period either by the central data processing unit 23 itself or by the respective monitoring unit 15. In the latter case, necessary input variables for the simulation, for example the progression of the ambient temperature and the loads, would have to be transmitted from the central data processing unit 23 to the monitoring units 15.

In the exemplary embodiment, the forecast period is 24 hours, with the hot-spot temperature being simulated at intervals of 15 minutes. Alternatively, the forecast period can also include a longer period of time, for example 48 or 72 hours, or a shorter period of time, for example 12 hours, and/or the simulation intervals can be longer or shorter.

In the second step 39 of the method, the simulated operating parameters are compared with relative and absolute limit values that have already been presented. This comparison can also take place in the central data processing device 23 or in the monitoring units 15, it being conceivable in the first case for the central data processing unit 23 to retrieve the limit values from the monitoring units 15.

If it is determined in this case that a limit value is considered to have been exceeded in the forecast period, the central data processing unit 23 suggests, in a third step 41, an alternative switching state in which no limit value is exceeded. The switching states can be displayed to an operator of the electrical distribution arrangement 1, for example via the user interface 33, or can be transmitted directly to the controller 25 of the substation 3.

In order to determine one or more alternative switching states, all switching times are run through in a first substep 43 for each possible switching state in a second substep 45 and—for each combination of switching state and switching time—the progression of the operating parameters is simulated in a third substep 47 on the basis of the output values for the operating parameters, the expected progression of the loads and the expected progression of the environmental parameters. These simulations can be carried out either by the central data processing device 23 or by the monitoring units 15. In addition, in the third substep 47, the maximum time for which the distribution arrangement can be operated in the switching state without a limit value being considered to have been exceeded is determined for each switching time and each switching state.

In a fourth substep 49, a minimum time for which the electrical distribution arrangement 1 can be operated in the switching state independently of the switching time is determined for each switching state from the maximum times determined on the basis of the switching time. This time is therefore a measure of how long the switching state can be operated in any case, without the switching time having to be taken into account.

Finally, in the fifth and final substep 51 of the third step 41, that switching state or those switching states in which the minimum time is the longest is/are selected. One or more switching states are thus determined in an advantageous manner and can be operated for as long as possible independently of the switching time. This switching state or these switching states is/are suggested to an operator of the electrical switching apparatus 1 as alternative switching states.

In a sixth and final step 53, a preferred switching time is also suggested to the operator. This can be particularly advantageous when there are selected switching times at which it is possible to switch to alternative switching states that can be operated for longer at this switching time than when switching at other switching times.

Finally, it should be pointed out that the sequence of steps and substeps used above is not mandatory. For example, calculation steps can be parallelized, and the minimum time can be recorded directly during the simulation of the alternative switching states and switching times. In addition, it is also conceivable to abort the determination of alternative switching states as soon as a predetermined number of switching states, which can be operated over the entire forecast period without a limit value being exceeded, has been found.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Electrical distribution arrangement
3 Substation
5 Supply input
7 Outgoing circuit
9 Electrical components, operating resources
10 Overhead lines
11 Transformer
13 Producer
15 Monitoring unit
17 Switching arrangement
19 Circuit breaker
21 Isolating switch
23 Central data processing device, data processing unit
25 Controller of the substation or the electrical distribution arrangement
27 CPU
29 Communication unit
31 Memory
33 User interface
35 System
37 First step
39 Second step
41 Third step
43 First substep
45 Second substep
47 Third substep
49 Fourth substep
51 Fifth substep
53 Sixth step

The invention claimed is:

1. A system for optimizing a switching state of a switching arrangement of an electrical distribution arrangement, the electrical distribution arrangement comprising: at least one supply input; the switching arrangement; a plurality of electrical components; and at least one outgoing circuit, the switching arrangement comprising: a plurality of switching states comprising the switching state, in each switching state of the plurality of switching states, the at least one outgoing circuit of the distribution arrangement is electrically connected to the at least one supply input of the distribution arrangement by the switching arrangement via at least one electrical component of the plurality of electrical components, each of the switching states differs from every other switching state in that the at least one outgoing circuit is electrically connected to the at least one supply input via another electrical component of the plurality of electrical components, and the switching arrangement comprising at least so many switching states that each one of the at least one outgoing circuit is electrically connectable to the at least one supply input-via two different components of the plurality of electrical components, the system being configured to:
present the at least one outgoing circuit based on; operating parameters of the electrical components of the plurality of electrical components, a present switching state of the switching arrangement, loads currently present at the at least one outgoing circuit of the distribution arrangement, present environmental parameters of the electrical components, forecasts of an expected future progression of the environmental parameters of the electrical components, and forecasts of an expected future progression of the loads present at the at least one outgoing circuit;

simulate a future development of the operating parameters of the plurality of electrical components, to compare the future development of the operating parameters with limit values, and based on one or more limit values being considered likely to be exceeded at a future point in time, suggest at least one alternative switching state that was selected in such a way that none of the operating parameters exceeds any limit value of the limit values.

2. The system as claimed in claim 1, wherein the system comprises a central data processor that is configured to suggest the alternative switching state.

3. The system as claimed in claim 1, wherein a monitor is arranged on at least one electrical component of the plurality of electrical components and is configured to provide the operating parameters of the electrical component, based on which the future progression of the operating parameters of the plurality of components is simulated.

4. The system as claimed in claim 3, wherein the monitor of the at least one electrical component is configured to simulate the future development of the operating parameters of the respective electrical component.

5. The system as claimed in claim 1, wherein the central data processor is further configured to simulate the future development of the operating parameters of at least one electrical component.

6. The system as claimed in claim 1, which is further configured to suggest a point in time at which there should be a change into the at least one alternative switching state.

7. The system as claimed in claim 1, which, in order to determine the at least one alternative switching state, is further configured to simulate, for a plurality of potential switching states of the switching arrangement, the future development of the operating parameters of the plurality of electrical components for a predetermined period of time based on the operating parameters, the present switching state, the loads present at the at least one outgoing circuit, the present environmental parameters, the forecasts of the expected future progression of the environmental parameters, and the forecasts of the expected future progression of the loads present at the at least one outgoing circuit.

8. The system as claimed in claim 7, which, in order to determine the at least one alternative switching state, is further configured to simulate, for the plurality of potential switching states of the switching arrangement, the future development of the operating parameters of the plurality of components for different switching times at which a switch is made from the present switching state to the respective potential switching state.

9. The system as claimed in claim 8, which, in order to determine the at least one alternative switching state, is further configured to determine, within the framework of the simulation, for each of the plurality of potential switching states for each switching time, a maximum period of time over which the potential switching state can be operated, without at least one operating parameter of the plurality of components exceeding a limit value, and to suggest the at least one alternative switching state on the basis of the determined maximum periods of time.

10. The system as claimed in claim 9, which is further configured:

to determine, for each potential switching state, a minimum period of time, over which the switching arrangement can be operated in the switching state independently of the switching time, without any of the limit values being considered to be exceeded by a simulated operating parameter, from the maximum periods of time determined for the switching times, and to suggest, as the at least one alternative switching state, that switching state or one of those switching states of the plurality of potential switching states, in which the determined minimum period of time over which the switching arrangement can be operated in the switching state independently of the switching time is the longest compared to all other determined minimum periods of time of the plurality of potential switching states.

11. The system as claimed in claim 1 which is configured to evaluate operating parameters of the electrical components as a basis for simulating the future development of the operating parameters of the electrical components using pattern recognition or machine learning methods.

12. A method for optimizing a switching state of a switching arrangement of an electrical distribution arrangement, the electrical distribution arrangement comprising: at least one supply input; the switching arrangement; and at least one outgoing circuit, the switching arrangement comprising a plurality of switching states, in each switching state of the plurality of switching states, at least one outgoing circuit of the electrical distribution arrangement is electrically connected to at least one supply input of the electrical distribution arrangement the switching arrangement via one component of the plurality of components, each of the switching states differs from every other switching state in that at least one outgoing circuit is electrically connected to at least one supply input via another component of the plurality of components, and the switching arrangement comprises at least so many switching states that each of the at least one outgoing circuit is electrically connectable to the supply input via two different components of the plurality of components, the method comprising:

simulating a future development of operating parameters of the plurality of components based on: the operating parameters of the components, a present switching state of the switching arrangement, loads present at the at least one outgoing circuit, present environmental parameters of the plurality of components, forecasts of a progression of the environmental parameters of the plurality of components, and forecasts of a progression of loads present at the at least one outgoing circuit, comparing the simulated operating parameters with limit values, and;

based upon one or more limit values being considered likely to be exceeded in the present switching state at a future point in time, suggesting at least one alternative switching state in which none of the simulated operating parameters is considered to be exceeded.

13. The method as claimed in claim 12, wherein the alternative switching state is suggested by a central data processor.

14. The method as claimed in claim 12, wherein a monitor is arranged on at least one component of the plurality of components and provides the operating parameters of the components based on which the future development of the operating parameters of the plurality of components is simulated.

15. The method as claimed in claim 14, wherein the future development of the operating parameters of the at least one component is simulated by the monitoring unit of the respective components.

16. The method as claimed in claim 12, wherein the central data processor simulates the future development of the operating parameters of at least one of the components.

17. The method as claimed in claim 12, in which a point in time at which there is intended to be a change into the at least one alternative switching state is also suggested.

18. The method as claimed in claim 12, wherein, in order to determine the at least one alternative switching state, for a plurality of potential switching states of the switching arrangement, the future development of the operating parameters of the plurality of components is simulated for a predetermined period of time based on the operating parameters, the present switching state, the loads present at the switching outputs, the present environmental parameters, the forecast of the progression of the environmental parameters, and the forecast of the progression of the loads present at the at least one outgoing circuit.

19. The method as claimed in claim 18, wherein, in order to determine the at least one alternative switching state, for the plurality of potential switching states of the switching arrangement, the future development of the operating parameters of the plurality of components is simulated for different switching times at which a switch is made from the present switching state to the respective potential switching state.

20. The method as claimed in claim 19, wherein, in order to determine the at least one alternative switching state, within the framework of the simulation, for each of the plurality of potential switching states for each switching time, a maximum period of time is determined, over which the potential switching state can be operated, without at least one limit value being considered to be exceeded by a simulated operating parameter, and the at least one alternative switching state is suggested on the basis of the determined maximum periods of time.

21. The method as claimed in claim 20, wherein, for each potential switching state, a minimum period of time, over which the switching arrangement can be operated in the respective switching state independently of the switching time, without a limit value being considered to be exceeded, is determined from the maximum periods of time for the different switching times, and wherein that switching state or one of those switching states of the plurality of potential switching states, in which the determined minimum period of time over which the switching arrangement can be operated in the switching state independently of the switching time is the longest compared to all other determined minimum periods of time of the plurality of potential switching states, is suggested as an alternative switching state.

22. The method as claimed in claim 12, wherein the operating parameters of the components are evaluated as a basis for simulating the future development of the operating parameters of the components using pattern recognition or machine learning methods.

23. The system as claimed in claim 1, wherein the electrical components of the distribution arrangement are transformers,
   wherein an operating parameter of the transformers is a hot-spot temperature in turns of the transformer,
   a top oil temperature, or
   an electric current flowing through a respective transformer.

24. The system as claimed in claim 1, wherein the environmental parameters of the electrical components are ambient temperatures.

25. The system as claimed in claim 1, wherein the system is configured to compare at least one of the operating parameters of one of the electrical components with at least one dynamic limit value, wherein the dynamic limit value is considered to be exceeded only when the operating parameter compared with the limit value exceeds the limit value for a predetermined time, and wherein at least one of the operating parameters of the electrical component is compared with at least one absolute limit value, wherein the absolute limit value is considered to be exceeded as soon as the operating parameter compared with the limit value exceeds the limit value.

* * * * *